(12) United States Patent
Bahar et al.

(10) Patent No.: US 7,689,047 B2
(45) Date of Patent: Mar. 30, 2010

(54) REDUCED BUFFER SIZE FOR JPEG ENCODING

(75) Inventors: Mickey Bahar, Kfar Netter (IL); Yoav Lavi, Raanana (IL)

(73) Assignee: Samsung Electronics Co, Ltd., Gyeonggi-do (KR)

( * ) Notice: Subject to any disclaimer, the term of this patent is extended or adjusted under 35 U.S.C. 154(b) by 1015 days.

(21) Appl. No.: 11/407,688

(22) Filed: Apr. 19, 2006

(65) Prior Publication Data

US 2007/0098272 A1     May 3, 2007

Related U.S. Application Data

(60) Provisional application No. 60/673,309, filed on Apr. 19, 2005.

(51) Int. Cl.
*G06K 9/36* (2006.01)
(52) U.S. Cl. .................................... 382/232
(58) Field of Classification Search ......... 382/232–236, 382/238–251; 348/384.1–390.1, 394.1–395.1, 348/400.1–416.1, 420.1–421.1, 430.1; 358/426.01–426.14; 375/240.01–240.24
See application file for complete search history.

(56) References Cited

U.S. PATENT DOCUMENTS

| | | | | |
|---|---|---|---|---|
| 6,141,447 A | * | 10/2000 | Linzer et al. | 382/236 |
| 6,687,410 B1 | * | 2/2004 | Brown | 382/239 |
| 7,076,105 B2 | * | 7/2006 | Lee | 382/233 |

* cited by examiner

*Primary Examiner*—Jose L Couso
(74) *Attorney, Agent, or Firm*—Harness, Dickey & Pierce

(57) ABSTRACT

A method of compressing an image according to an image compression algorithm includes sequentially receiving pixel values into a buffers bank in line-by-line order. The image includes a plurality of pixels arranged into lines and columns. Each pixel has a pixel value associated therewith. Each line has L pixels. The image compression algorithm operates on blocks of pixels, each block having N lines and M columns. The method also includes storing each block-line of pixel values in a buffer of the buffers bank. A block-line includes M consecutive pixels of a line. The method also includes, for each block-line, storing a pointer to the buffer in which the block-line is stored and reading block-lines out of the buffers bank to a compression engine, wherein the block-lines are read out of the buffers bank in an order that is different from the line-by-line order in which the block-lines were received into the buffers bank. The method further includes compressing the image according to the image compression algorithm and displaying the image.

20 Claims, 5 Drawing Sheets

REDUCED BUFFER SIZE FOR JPEG ENCODING

CROSS-REFERENCES TO RELATED APPLICATIONS

This application is a non-provisional of, and claims the benefit of, co-pending, commonly-assigned, U.S. Provisional Patent Application No. 60/673,309 entitled "REDUCED BUFFER SIZE FOR JPEG ENCODING OF REAL-TIME VIDEO STREAM," filed on Apr. 19, 2005, by Bahar and Lavi, the entire disclosure of each of which is herein incorporated for all purposes.

FILED OF THE INVENTION

Embodiments of the present invention relate generally to the field of image compression. More particularly, embodiments of the present invention relate to image compression systems and methods employing buffers.

BACKGROUND OF THE INVENTION

Many people are familiar with the image compression system known as JEPG (Joint Photographic Experts Group). JPEG encoding is typically done on rectangular blocks of image pixels, each block having 8 lines and 8 columns. Most image capture devices, however, are incapable of outputting raw image data in blocks that correspond to the JPEG standard. Instead, most image capture devices output entire lines in sequential order. Hence, JPEG compression cannot begin on a new block until the $8^{th}$ line of the block is read. And while compression is taking place on the first block, the image output for all other blocks of the same lines must be buffered.

Most JPEG encoders use a 16-line buffer. The JPEG encoder's engine compresses the blocks of lines 1 to 8, while lines 9 to 16 are stored in the buffer. Then the JPEG compresses the blocks of lines 9 to 16, while lines 17 to 24 are stored, and so on. This technique is called double buffering; it is simple but inefficient.

BRIEF SUMMARY OF THE INVENTION

Embodiments of the present invention this provide a method of compressing an image according to an image compression algorithm. The image includes a plurality of pixels arranged into lines and columns, Each pixel has a pixel value associated therewith. Each line has L pixels. The method includes sequentially receiving pixel values into a buffers bank in line-by-line order. The image compression algorithm operates on blocks of pixels, each block having N lines and M columns. The method also includes storing each block-line of pixel values in a buffer of the buffers bank. A block-line includes M consecutive pixels of a line. The method also includes, for each block-line, storing a pointer to the buffer in which the block-line is stored and reading block-lines out of the buffers bank to a compression engine, wherein the block-lines are read out of the buffers bank in an order that is different from the line-by-line order in which the block-lines were received into the buffers bank. The method further includes compressing the image according to the image compression algorithm and displaying the image.

In some such embodiments, the image compression algorithm is a JPEG image compression algorithm. In some embodiments, M=8 and N=8. The buffers bank may have exactly L/M*(N−1) buffers. Storing a pointer to the buffer in which the block-line is stored may include storing the pointer in a pointer table. The pointer table may have at least L/M*N storage locations, each storage location corresponding to a particular location within a block of a block-line. The pointer table may have at least 2*L/M*N storage locations, each storage location corresponding to a particular location within a block of a block-line. Reading block-lines out of the buffers bank to an encoding engine may include receiving an empty signal from a semaphore, in response to the empty semaphore signal, reading a pointer, using the pointer to address a buffer of the buffers bank, and placing the pointer in a reuse pointer register. Storing a pointer to the buffer in which the block-line is stored may include storing a block number and a block-line number of the block-line in a storage location of an allocation table. The storage location may be associated with the pointer. Reading block-lines out of the buffers bank to an encoding engine may include searching the allocation table for a block and a block-line that correspond to a particular block-line to be forwarded to the compression engine, upon finding the particular block and block-line, obtaining the pointer from the allocation table, and using the pointer to address the particular block-line from the buffers bank. The method also may include storing the pointer to the particular block-line in a random-in/sequential out register, whereby the pointer is stored with other pointers in the order that is different than the line-by-line order.

Other embodiments provide an image compression system configured to compress an image according to an image compression algorithm. The image includes a plurality of pixels arranged into lines and columns. Each pixel has a pixel value associated therewith. Each line has L pixels. The image compression algorithm operates on blocks of pixels, each block having N lines and M columns. The system includes a buffers bank configured to receive incoming pixel values in line-by-line order and store block-lines of pixel values in a buffer of the buffers bank. A block-line includes M consecutive pixels of a line. The system also includes a pointer table configured to store pointers to buffers in which block-lines are stored and logic configured to use the pointers to read block-lines from the buffers block to a compression engine. The logic is configured to read block-lines out of the buffers bank in an order that is different from the line-by-line order in which the pixel values were received into the buffers bank.

In some such embodiments, M=8 and N=8. The image compression algorithm may be a JPEG image compression algorithm. The buffers bank may includes exactly L/M*(N−1) buffers. The system may include a reuse pointer register and an empty semaphore flip flop. The reuse pointer register and the empty semaphore flip flop may cooperate to cause the logic to reuse previously-used buffers of the buffers block once block-lines are read from the buffers.

Still other embodiments provide an image compression system configured to compress an image according to an image compression algorithm. The image includes a plurality of pixels arranged into lines and columns. Each pixel has a pixel value associated therewith. Each line has L pixels. The image compression algorithm operates on blocks of pixels, each block having N lines and M columns. The system includes a buffers bank configured to receive incoming pixel values in line-by-line order and store block-lines of pixel values in a buffer of the buffers bank. A block-line includes M consecutive pixels of a line. The system also includes an allocation table configured to store a plurality of block and block-line pairs. Each block and block-line pair corresponds to a pointer to a storage location in the buffers bank. Each block and block-line pair indicates a position of a block-line within the block. The system also includes logic configured to use the block and block-line pairs to read block-lines from the buffers block to a compression engine. The logic is configured to read block-lines out of the buffers bank in an order that is different from the line-by-line order in which the pixel values were received into the buffers bank.

In some such embodiments, M=8 and N=8. The image compression algorithm may be a JPEG image compression algorithm. The buffers bank may include exactly L/M*(N−1) buffers. The system may include a reuse pointer register and an empty semaphore flip flop. The reuse pointer register and the empty semaphore flip flop may cooperate to cause the logic to reuse previously-used buffers of the buffers block once block-lines are read from the buffers.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
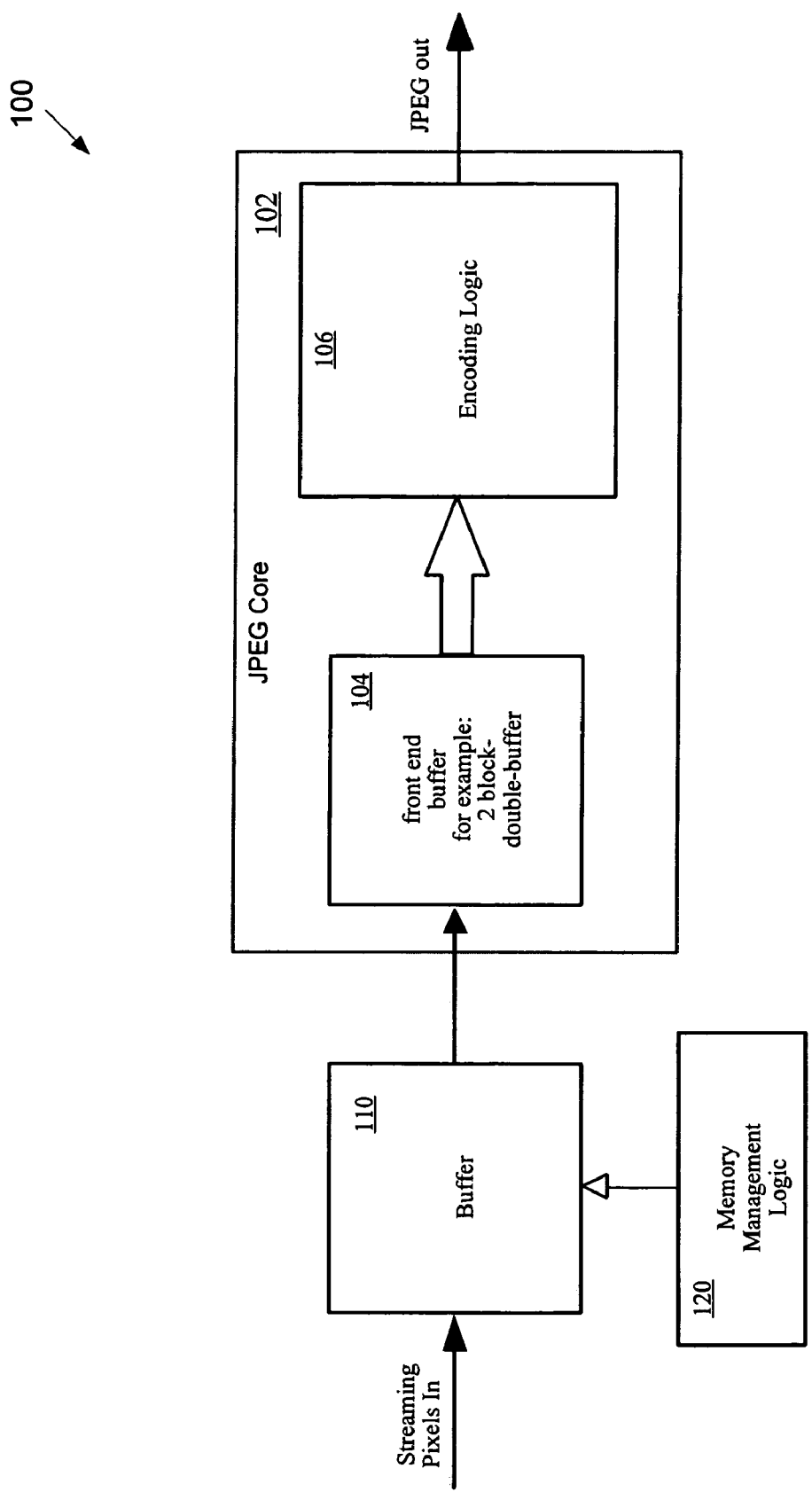
FIG. 1 depicts a block diagram of an image compression system according to embodiments of the invention.

Embodiments of the present invention provide image compression systems having memory management logic that allows reduced buffer size for buffering incoming pixels. In order to provide a context for describing embodiments of the present invention, embodiments of the invention will be described herein with reference to JPEG image compression, though this is not a requirement. Those skilled in the art will appreciate that the systems and methods described herein may be applied to many other types of block-based image compression systems.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It is to be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, systems may be shown in block diagrams in order not to obscure the embodiments in unnecessary detail. In other instances, well-known processes, structures and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Real-time image compression systems receive an incoming pixel stream from a source and compress the stream to thereby reduce the image's file size. Image sources may include image capture devices, files of raw image data, and/or the like. Once compressed, the image file may be sent to a storage medium, a display, and/or the like.

Most image sources output image information line-by-line. Some image compressions standards (e.g., JPEG) operate on image information in increments shorter than a full line. Specifically, for example, JPEG image compression operates on blocks of eight lines and eight columns. Hence, incoming pixel information may be buffered, or otherwise stored.

JPEG cores typically include a small buffer because the JPEG core engine reads the same image information several times during the compression process. This buffer, however, is typically not sufficient to keep up with the transfer rate from the image source. Embodiments of the invention may be adapted to work with JPEG cores that both include and exclude such buffers.

Conventional buffers, external to the JPEG core, used in JPEG processing typically include storage for a number of lines from the image source. The number of lines is typically twice the number of lines in a block, a block being the portion of the image that the compression algorithm works on. In the case of JPEG, the algorithm works on a block having eight columns and eight lines, each line referred to as a "block-line."

According to embodiments of the invention, a much smaller buffer may be used. Embodiments of the present invention employ memory management logic in combination with a buffer bank having n−1 lines, n being the number of lines in a block on which the algorithm operates. Hence, embodiments of the present invention significantly reduce the size of the buffer that buffers incoming pixels from an image source prior to compression.

Having described embodiments of the invention generally, attention is directed to FIG. 1, which illustrates an exemplary image compression system 100 that compresses images according to the JPEG standard. While embodiments of the present invention are described using the JPEG image compression standard, those skilled in the art will appreciate that other exemplary embodiments could use other image compression standards, particularly any image compression standard that operates on segments of pixels shorter than the corresponding lines containing the segments. The exemplary system 100 includes a JPEG core 102 having a front end buffer 104 and JPEG encoding logic 106. In addition to the JPEG core 102, the system 100 includes a buffers bank 110 and memory management logic 120. The front end buffer 104 may be a double, 8×8 pixel buffer. Such an arrangement allows the encoding logic to operate on the pixel information for a first block from one buffer while pixel information for a second block is written to the other buffer. Those skilled in the art will appreciate, in light of the disclosure herein, that the encoding core need not be a JPEG core and need not include a front end buffer.

In operation, the system 100 receives pixels streaming from an image source (not shown) into the buffer 110. The image source may be an image capture panel from an image capture device, such as a digital still camera, a cell phone camera, a video camera, and/or the like. The image source also may be an electronic file. Other possibilities exist. The memory management logic 120 determines where pixel information is placed into the buffer 110 and determines the order in which pixel information is sent to the JPEG core. The JPEG core converts the image information into JPEG output and sends the output to, for example, a storage medium.

Heretofore, the memory management logic 120 simply wrote incoming data to the buffer 110 and read the data from the buffer 110 as it was needed, the buffer 110 having the capacity to store two full lines of image data. According to embodiments of the invention, however, the memory management logic 120 is more sophisticated, as described in greater detail immediately hereinafter, thus allowing the buffer 110 to be smaller.

Figure 2:
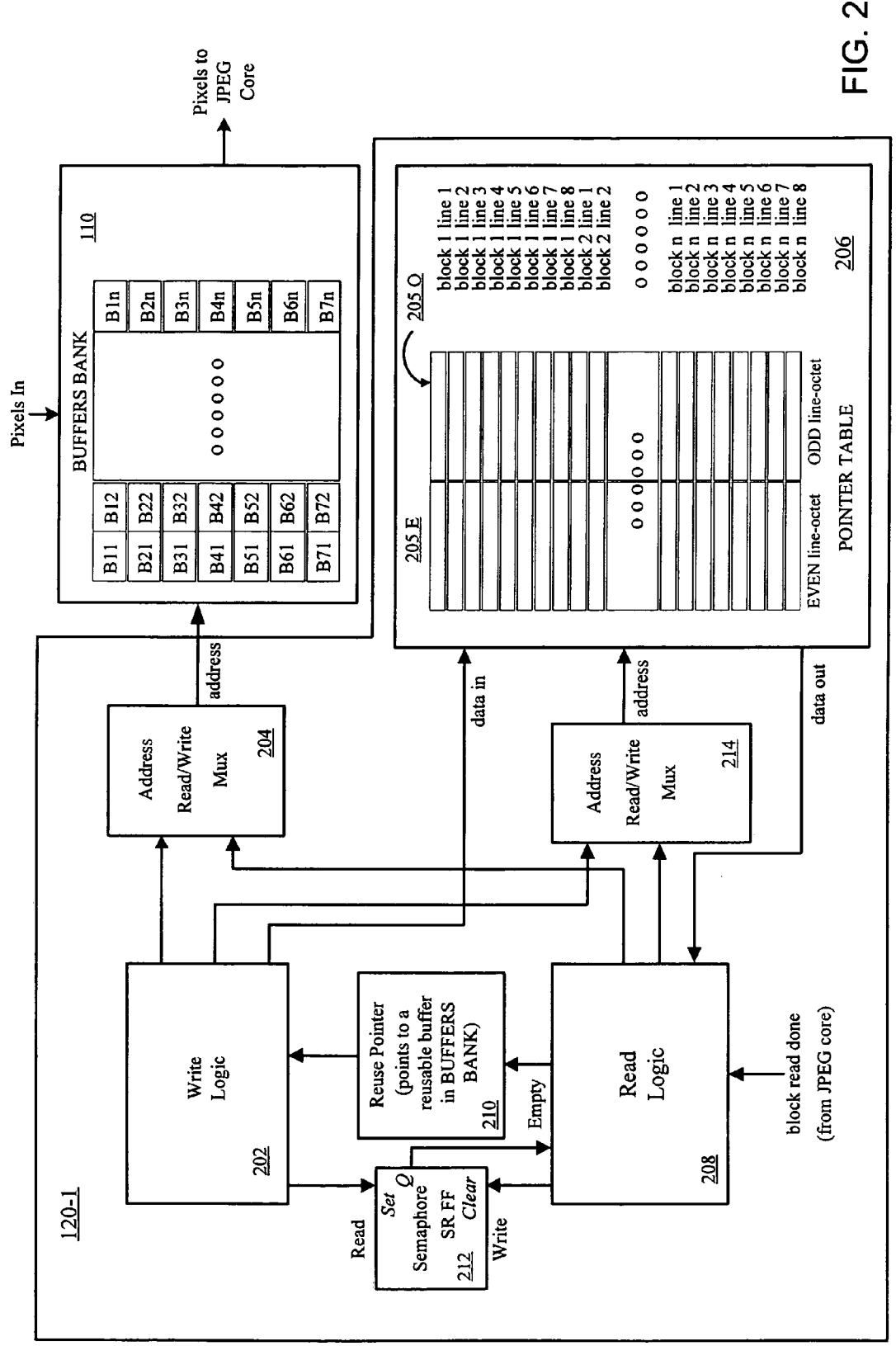
FIG. 2 depicts a block diagram of a first embodiment of memory management logic which may be used in the system of FIG. 1.

Attention is directed to FIG. 2, which illustrates a first exemplary embodiment of the memory management logic 120-1 that works with the JPEG core 102 and buffer 120 to compress images according to the JPEG standard. For ease of illustration, the JPEG core is not shown in FIG. 2. The memory management logic 102-1 includes write logic 202 and a first address multiplexer 204. The first address multiplexer addresses the buffer 110, which includes a buffers bank. The buffers bank includes a plurality of, for example, FIFO buffers (B11, B12, . . . ), each configured to store a single block-line. The memory management logic 102-1 also includes a pointer table 206 having even (205 $e$) and odd (205 $o$) line octets, read logic 208, and a second address multiplexer 214 that addresses the pointer table. The pointer table stores pointers to specific blocks in the buffers bank. The memory management logic 120-1 also includes a reuse pointer register 210 and an empty semaphore flip flop 212.

The pointer table 206 includes two line octets 205 $e$, 205 $o$. Each octet 205 includes pointers for 8 video lines. The eight video lines include image data for n JPEG blocks. For example, if each line includes 640 pixels, then n is 80 (640 pixels per line divided by 8 pixels per block line). Hence, each octet 205 includes 8*n block-line pointers. The right octet 205 $o$ may be used to store pointers for the odd line-octets of the image—lines 1 to 8, and then lines 17 to 24, and so on. The left octet 205 $e$ may be used to store pointers for the even line-octets of the image—lines 9 to 16, and then lines 25 to 32, and so on.

The reuse pointer register 210, in conjunction with the empty semaphore flip flop 212, is used to recycle buffers which may no longer be needed. It may also be used to adjust the rates of the JPEG core to the rate in which new pixels arrive. The semaphore 212 indicates whether the reuse pointer 210 is Empty or Full.

The write logic 202 addresses the buffers bank 110 to determine where new entries are written into the buffers bank 110. The write logic 202 also updates the pointer table 206 with a pointer to a particular buffer block in the buffers bank 110. When all the buffer blocks of the buffers bank 110 are full, the write logic may obtain a recycled buffer, which is no longer needed, from the reuse pointer 210 and set the empty semaphore 212, indicating that the reuse pointer register 210 is empty.

The read logic 208 reads entries from the buffers bank 110 using pointers obtained from the pointer table 206. It sends pointers to freed buffers to the reuse pointer register 210 and clears the empty semaphore 212. The read logic 208 typically reads block-lines in the order that the JPEG core needs them, i.e. first all the block-lines of block 1, then those of block 2, etc.

The first address multiplexer 204 addresses the buffers bank 110 in response to an address received from either the write logic 202 or the read logic 208. Similarly, the second address multiplexer 214 addresses the pointer table 206 in response to signals received from either the write logic 202 or the read logic 208.

Figure 3:
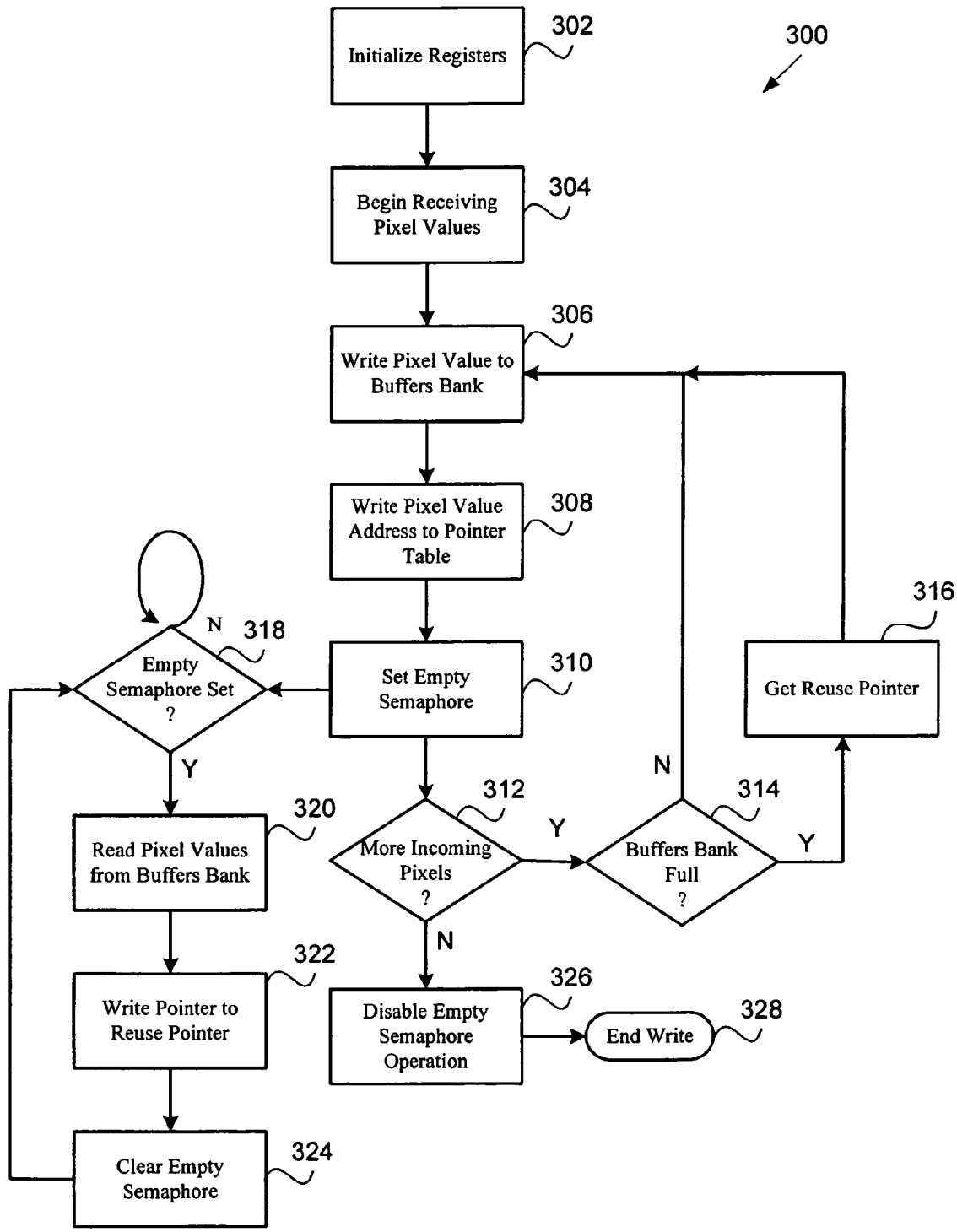
FIG. 3 is a flow chart of a first method embodiment for using the memory management logic of FIG. 2.

Having described a first exemplary embodiment of an image compress system 120-1, attention is directed to FIG. 3, which depicts an exemplary method 300 of operating the image compression system 120-1. Those skilled in the art will appreciate that the method 200 is merely exemplary of a number of possible embodiments. Other embodiments may include more, fewer, or different steps than those illustrated and described herein. Moreover, in other embodiments, the steps illustrated and described herein may be traversed in different orders.

The method 300 begins at block 302 at which point the system registers are initialized. This includes, for example, clearing all the buffer blocks of the buffer bank 110, clearing the reuse pointer register 210 and clearing the empty semaphore flip flop 212. At block 304, pixels begin streaming in from the image source. As pixel information is received at the buffers bank 110, the write logic 202 determines into which buffer blocks of the buffers bank 110 pixel information is to be written. The buffers bank 110 stores the pixel information in groups of pixels comprising one block-line. This takes place at block 306. At block 308, a pointer to a buffer block is stored in the pointer table 206. The pointer points to the buffer block in which the just-written block-line was written. The storage location in the pointer table 206 corresponds to the block-line's position. Then at block 310, the empty semaphore 212 is set, signaling to the read logic that the reuse pointer is empty and that pixel information is available to be read out by the read logic 208 to the JPEG core.

As the first pixels arrive, the write logic 202 writes the pixel values to consecutive buffers in the buffers bank 110. The write logic 202 associates incoming block-lines with JPEG block and JPEG lines. For example, the write logic associates the first block-line received with block 1, line 1, the second with block 2, line 1, and so on. The n+1th block-line is block 1 line 2. As each of the block lines has a unique address in the pointer table 206, the write logic 202 writes the pointer to the selected buffer in the appropriate location in the pointer table 206.

At block 312, the memory management logic 120 determines whether pixels are continuing to stream in. If so, a determination is made whether the buffers bank 110 is full. If the buffers bank 110 is not full, the write logic 202 writes the next incoming line to the next location in the buffers bank 206. If the buffers bank 110 is full, the write logic 202 obtains a buffer pointer from the reuse pointer register 210 at step 316. In either case, the write process continues back at block 306 and the next block-line is written to the appropriate location in the buffers bank 206.

After the first block-line is written, the write logic 202 may perform a dummy read of the reuse pointer 210 and set the empty semaphore 212 high. As a result, the read logic 208 is signaled to begin reading block-lines out to the JPEG core. This logic is performed at block 318. If the empty semaphore 212 is high, the process continues at block 320 at which point the read logic 208 obtains the next pointer from the pointer table 206 and reads the pixel value from the buffers bank 110. The pointer is written to the reuse pointer register 210 at block 322, and the empty semaphore 212 is cleared. This signals to the write logic 202 that the buffer block indicated by the pointer is available. The process then returns to block 318, at which point the read logic 208 continues to watch for the empty semaphore to be set.

When there are no more incoming pixels, as determined at block 312, the write logic 202 no longer needs recycled buffers. In order for the read logic 208 to continue, the empty semaphore 212 needs to be disabled. One way to do so is to force the empty semaphore 212 to maintain being set, even though the read logic 208 continues to clear it. Disabling the empty semaphore takes place at block 326 and the writing portion of the process ends at terminator 328. The read process 318-324 continues until the entire image has been output to the JPEG core.

Those skilled in the art will appreciate that many equivalent constructions in light of the disclosure herein. For example, the reuse pointer register 210, and the empty semaphore flip flop 212 may be a single entry, FIFO memory. FIFO memories of larger sizes may be used. A single entry FIFO has been described for the purpose of illustration.

Figure 4:
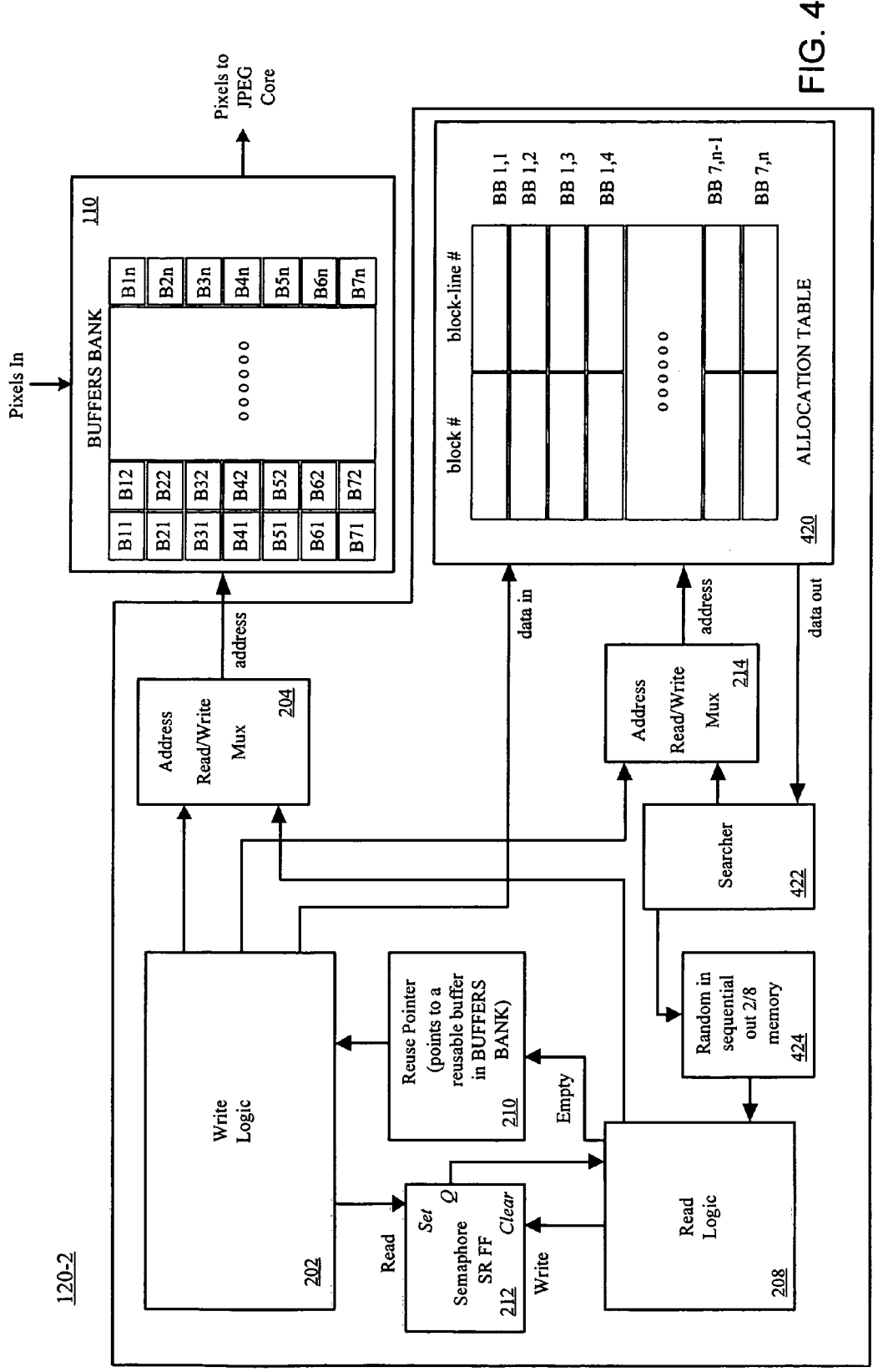
FIG. 4 depicts a block diagram of a second embodiment of memory management logic which may be used in the system of FIG. 1.

Attention is directed to FIG. 4, which illustrates a second exemplary embodiment of memory management logic 120-2. In this embodiment, the pointer table 206 is replaced with an allocation table 420. The allocation table 420 includes an entry for each buffer in the buffers bank 110. The buffers bank 110 continues to store the pixel information for a block-line of pixels, as in the previous embodiment. The allocation table 420 includes two entries: the first entry, block #, identifies the number of the block within the image of a particular block-line. The block-line # indicates the number of the block-line within the block. Entries in the allocation table 420 are arranged according to their order in the buffers bank 110. I.e., the first entry in the allocation table 420 relates to the first buffer B11 in the buffers bank 110, the second entry relates to the second buffer B12, and so on.

It should be noted that the first entry does not necessarily have a unique number for each of the possible JPEG blocks in the image. The block count may be reset to zero after 16 lines, and restart again. This may save the number of bits in the first entry, allowing the allocation table to be smaller. For example, for a 2048×1536 image, with 16 pixels in a block-line, the number of blocks is (1536/8)*(2048/16)=24,576, and hence 15 bits are needed in the first field for a full representation of the block number. If, however, the block counter is reset after every 16 lines, this number shrinks to (16/2)*(2048/16)=1024, and only 10 bits are needed for this field.

The read logic 208 performs generally as described previously with respect to the first embodiment. Because the entries in the allocation table 420 are not sorted into the order in which they are needed for the compression engine, a searcher 422 is used to search the allocation table 420 for the next block-line. When found, the searcher 422 writes the location to a random-in/sequential-out (RISO) memory 424, which in some embodiments has the capacity to hold pointers for two block-lines. This allows a subsequent block-line location to be identified to the RISO 424 while the immediately-previous block line needed by the core I is being output.

The reuse pointer register 210 functions in combination with the empty semaphore flip flop 212 as in the previous embodiment. Together they control the transmission rate, preventing the JPEG encoder from overrunning the filling of the pixels.

The searcher 422 may be implemented in one of several ways. In systems wherein the pixel transfer rate is one or two clocks per pixel, however, the searcher 422 may have to search several entries of the allocation table 420 in a single clock cycle. This may be achieved, for example, by creating a parallel organization of the searcher 422 and by arranging the allocation table 420 as eight memory banks, each storing an eighth of the entries of the allocation table 420, with all banks being read concurrently.

Figure 5:
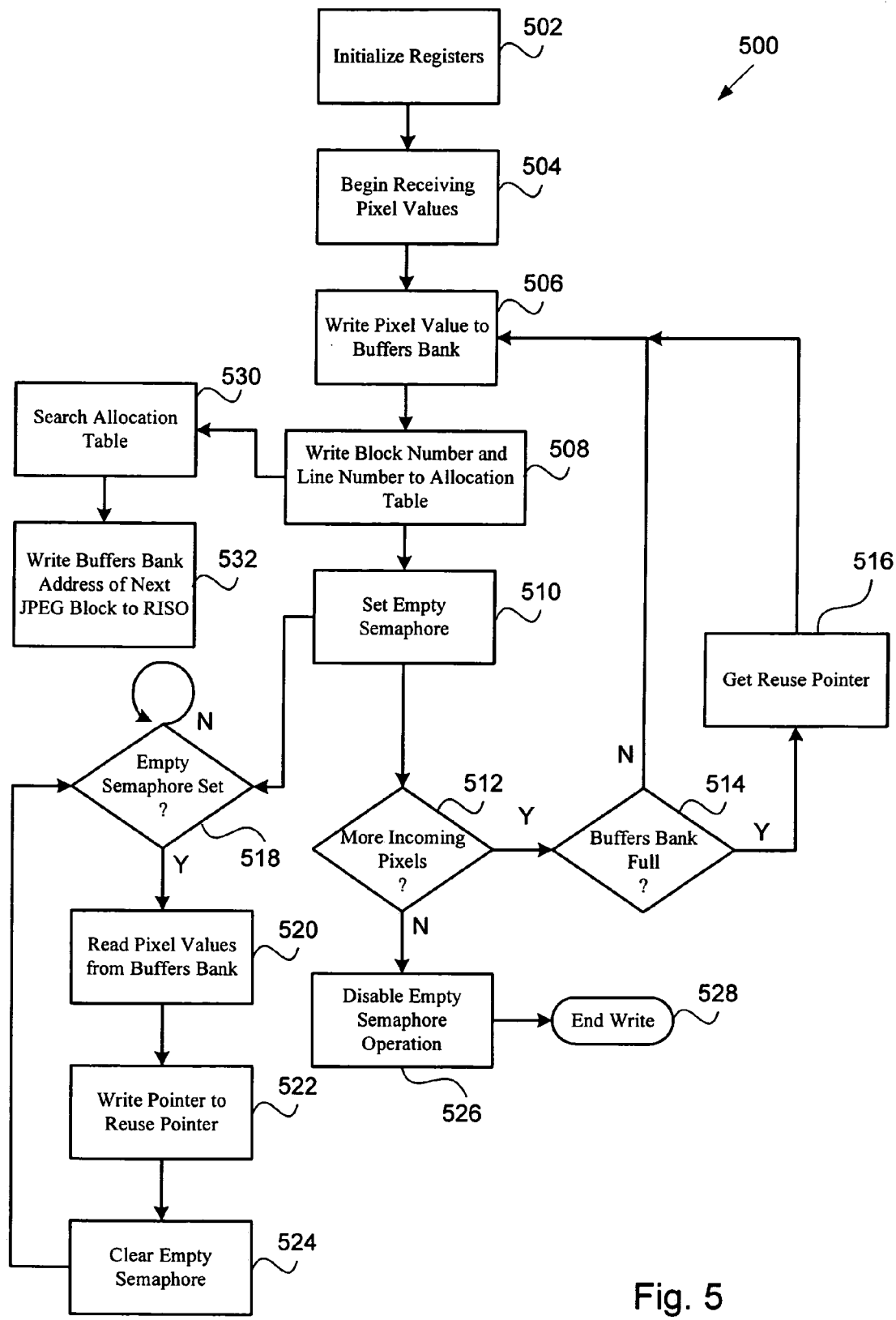
FIG. 5 is a flow chart of a second method embodiment for using the memory management logic of FIG. 4.

Having described memory management logic 120-2 according to a second embodiment, attention is directed to FIG. 5, which illustrates a second exemplary method 500 that may be implemented in the memory management logic 120-2. The method 500 includes many of the same steps as the previously-described method embodiment 300. For example, the registers are initialized at block 502, pixel values are received at block 504, and pixel values for a block-line are written to the buffers bank 110, all as in the previously-described embodiment. At block 508, however, the block number and the block-line number of the just-written block-line are written to the allocation table 420. This is in contrast to the previous embodiment, wherein a pointer to a storage location in the buffers bank 110 is written to the pointer table 206. At blocks 510, 512, 514, 516, the write operation continues as in the previous embodiment.

Similarly, the read operation takes place at block 518, 520, 522, 524 as in the previous embodiment. The read operation, however, reads block-lines from the buffers bank 110 based on what the searcher 422 locates in the allocation table 420. This operation takes place at block 530. When the searcher 422 locates the next block-line needed by the core, it writes the buffer location of the block-line to the RISO 424. The read logic 208 uses the buffers bank address to read the block-line out to the core at block 520.

In some embodiments, the reuse pointer register 210 and the empty semaphore flip flop 212 may be comprised by a single entry FIFO. FIFO memories of larger sizes may be used in some embodiments, which may produce smoother operation.

Having described several embodiments, it will be recognized by those of skill in the art that various modifications, alternative constructions, and equivalents may be used without departing from the spirit and scope of the invention. Additionally, a number of well known processes and elements have not been described in order to avoid unnecessarily obscuring the present invention. Accordingly, the above description should not be taken as limiting the scope of the invention, which is defined in the following claims.

What is claimed is:

1. A method of compressing an image according to an image compression algorithm using a processor configured to generate signals, wherein the image includes a plurality of pixels arranged into lines and columns, wherein each pixel has a pixel value associated therewith, and wherein each line has L pixels, the method comprising:
   sequentially receiving pixel values into a buffers bank in line-by-line order based on the signals generated by the processor, wherein the image compression algorithm operates on blocks, of pixels, each block having N lines and M columns;
   storing each block-line of pixel values in a buffer of the buffers bank based on the signals generated by the processor, each buffer of the buffers bank being configured to store a single block-line, wherein a block-line includes M consecutive pixels of a line;
   for each block-line, storing a pointer to the buffer in which the block-line is stored based on the signals generated by the processor;
   reading block-lines out of the buffers bank to a compression engine based on the signals generated by the processor, wherein the block-lines are read out of the buffers bank in an order that is different from the line-by-line order in which the block-lines were received into the buffers bank based on the signals generated by the processor;
   compressing the image according to the image compression algorithm based on the signals generated by the processor;
   and displaying the image based on the signals generated by the processor.

2. The method of claim 1, wherein the image compression algorithm comprises a JPEG image compression algorithm.

3. The method of claim 1, wherein M=8 and N=8.

4. The method of claim 1, wherein the buffers bank comprises exactly L/M*(N−1) buffers.

5. The method of claim 1, wherein storing a pointer to the buffer in which the block-line is stored comprises:
   storing the pointer in a pointer table, wherein the pointer table has at least L/M*N storage locations, each storage location corresponding to a particular location within a block of a block-line.

6. The method of claim 1, wherein storing a pointer to the buffer in which the block-line is stored comprises:
   storing the pointer in a pointer table, wherein the pointer table has at least 2*L/M*N storage locations, each storage location corresponding to a particular location within a block of a block-line.

7. The method of claim 1, wherein reading block-lines out of the buffers bank to an encoding engine, comprises:
   receiving an empty signal from a semaphore;
   in response to the empty semaphore signal, reading a pointer;
   using the pointer to address a buffer of the buffers bank; and
   placing the pointer in a reuse pointer register.

8. The method of claim 1, wherein storing a pointer to the buffer in which the block-line is stored comprises storing a block number and a block-line number of the block-line in a storage location of an allocation table, wherein the storage location is associated with the pointer.

9. The method of claim 8, wherein reading block-lines out of the buffers bank to an encoding engine, comprises:
   searching the allocation table for a block and a block-line that correspond to a particular block-line to be forwarded to the compression engine;
   upon finding the particular block and block-line, obtaining the pointer from the allocation table; and
   using the pointer to address the particular block-line from the buffers bank.

10. The method of claim 9, further comprising storing the pointer to the particular block-line in a random-in/sequential out register, whereby the pointer is stored with other pointers in the order that is different than the line-by-line order.

11. An image compression system configured to compress an image according to an image compression algorithm, wherein the image includes a plurality of pixels arranged into lines and columns, wherein each pixel has a pixel value associated therewith, wherein each line has L pixels, and wherein the image compression algorithm operates on blocks of pixels, each block having N lines and M columns, the system comprising:
   a processor configured to generate signals;
   a buffers bank configured to receive incoming pixel values in line-by-line order and store block-lines of pixel values in a buffer of the buffers bank based on the signals generated by the processor, each buffer of the buffers bank being configured to store a single block-line, wherein a block-line includes M consecutive pixels of a line;
   a pointer table configured to store pointers to buffers in which block-lines are stored based on the signals generated by the processor;
   logic configured to use the pointers to read block-lines from the buffers block to a compression engine based on the signals generated by the processor, wherein the logic is configured to read block-lines out of the buffers bank in an order that is different from the line-by-line order in which the pixel values were received into the buffers bank.

12. The system of claim 11, wherein M=8 and N=8.

13. The system of claim 11, wherein the image compression algorithm comprises a JPEG image compression algorithm.

14. The system of claim 11, wherein the buffers bank comprises exactly L/M*(N−1) buffers.

15. The system of claim 11, further comprising:
   a reuse pointer register; and
   an empty semaphore flip flop;
   wherein the reuse pointer register and the empty semaphore flip flop cooperate to cause the logic to reuse previously-used buffers of the buffers block once block-lines are read from the buffers.

16. An image compression system configured to compress an image according to an image compression algorithm, wherein the image includes a plurality of pixels arranged into lines and columns, wherein each pixel has a pixel value associated therewith, wherein each line has L pixels, and wherein the image compression algorithm operates on blocks of pixels, each block having N lines and M columns, the system comprising:

a processor configured to generate signals;

a buffers bank configured to receive incoming pixel values in line-by-line order and store block-lines of pixel values in a buffer of the buffers bank based on the signals generated by the processor, each buffer of the buffers bank being configured to store a single block-line, wherein a block-line includes M consecutive pixels of a line;

an allocation table configured to store a plurality of block and block-line pairs based on the signals generated by the processor, each block and block-line pair corresponding to a pointer to a storage location in the buffers bank, each block and block-line pair indicating a position of a block-line within the block;

logic configured to use the block and block-line pairs to read block-lines from the buffers block to a compression engine based on the signals generated by the processor, wherein the logic is configured to read block-lines out of the buffers bank in an order that is different from the line-by-line order in which the pixel values were received into the buffers bank.

17. The system of claim 16, wherein M=8 and N=8.

18. The system of claim 16, wherein the image compression algorithm comprises a JPEG image compression algorithm.

19. The system of claim 16, wherein the buffers bank comprises exactly $L/M*(N-1)$ buffers.

20. The system of claim 16, further comprising:

a reuse pointer register; and an empty semaphore flip flop;

wherein the reuse pointer register and the empty semaphore flip flop cooperate to cause the logic to reuse previously-used buffers of the buffers block once block-lines are read from the buffers.

* * * * *